L. E. SHAW.
VEHICLE TOP CONTROLLING MECHANISM.
APPLICATION FILED MAY 5, 1917.

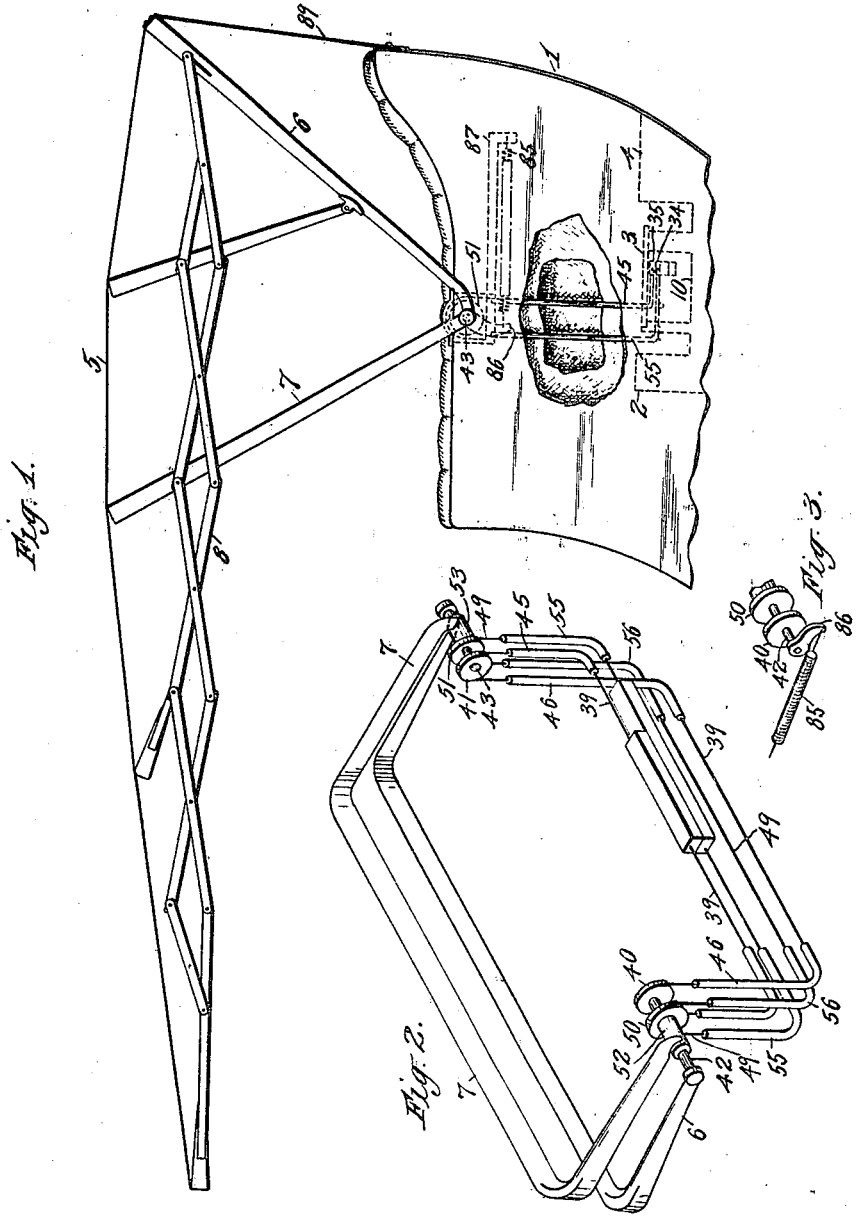

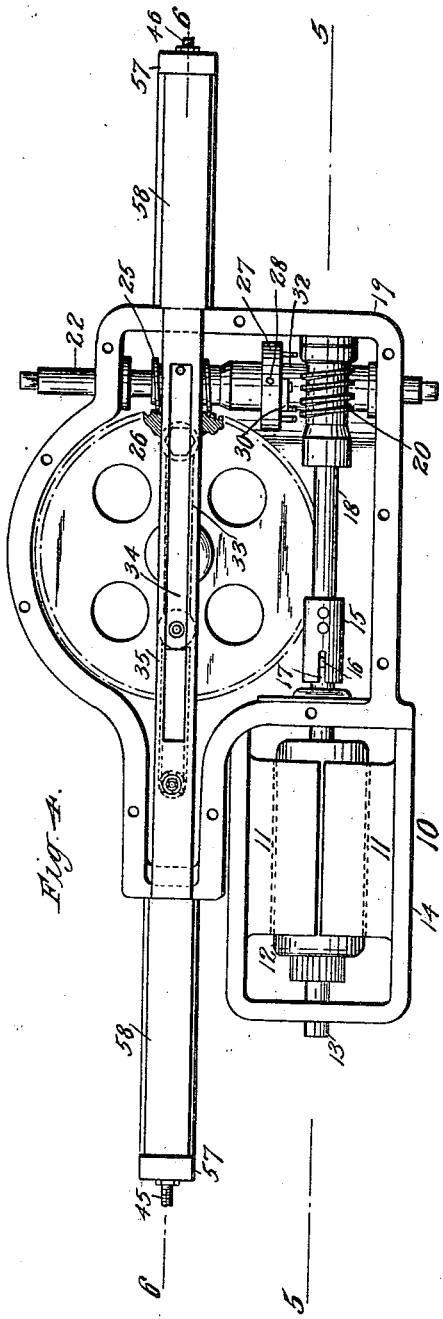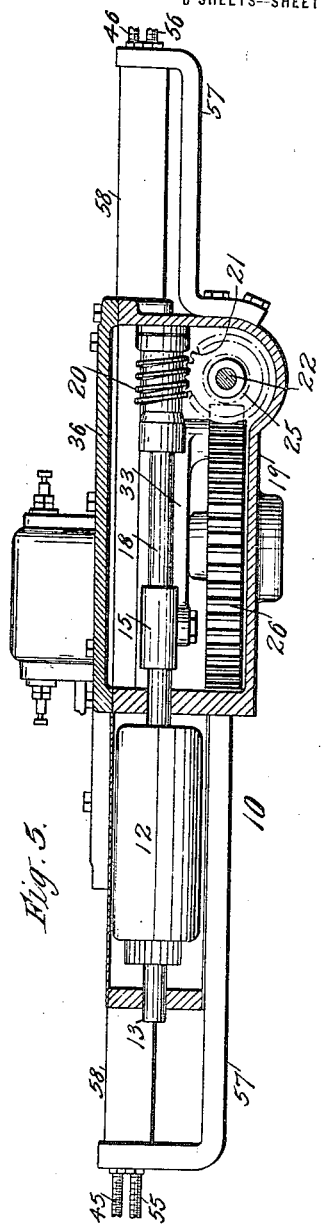

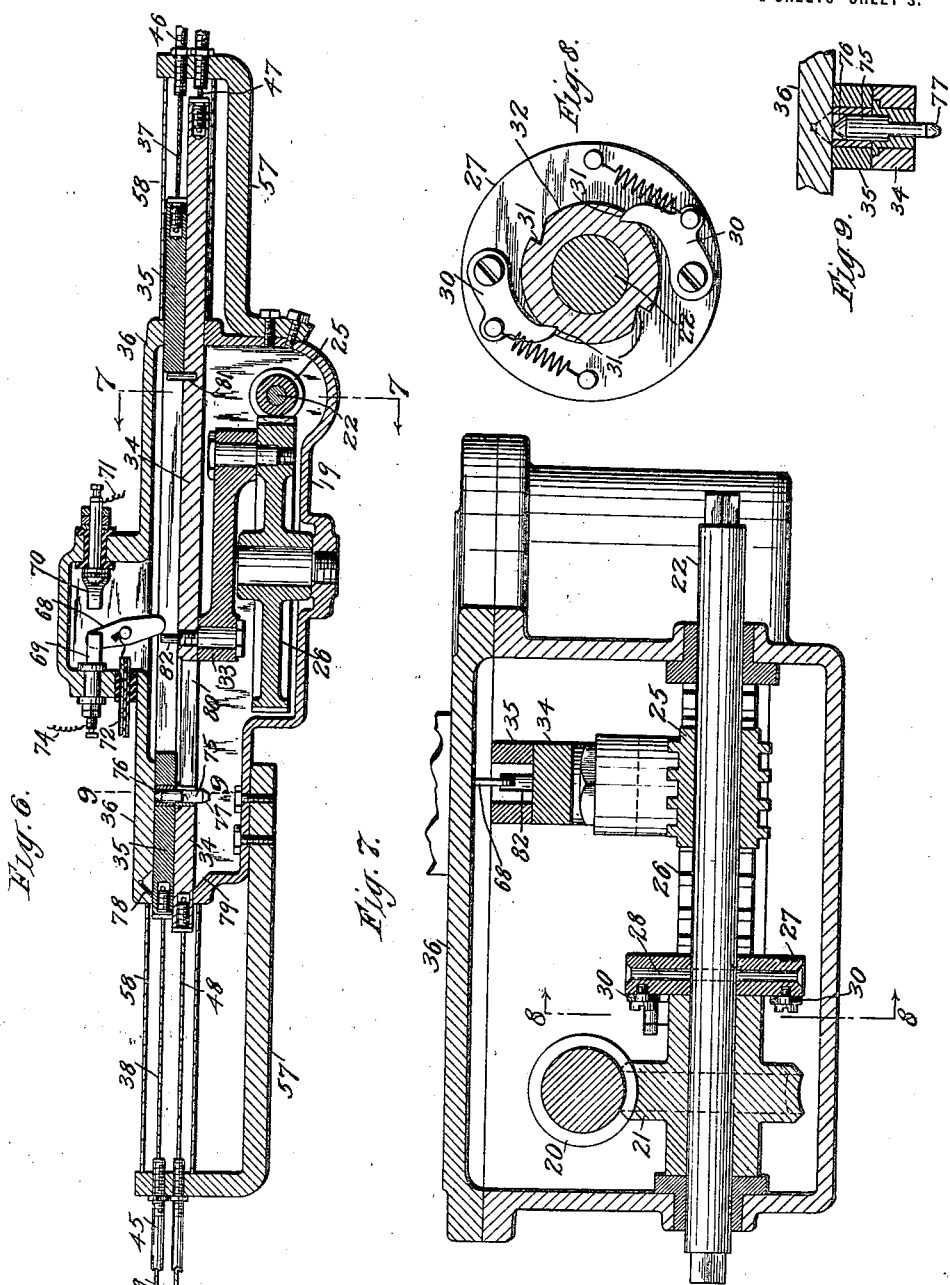

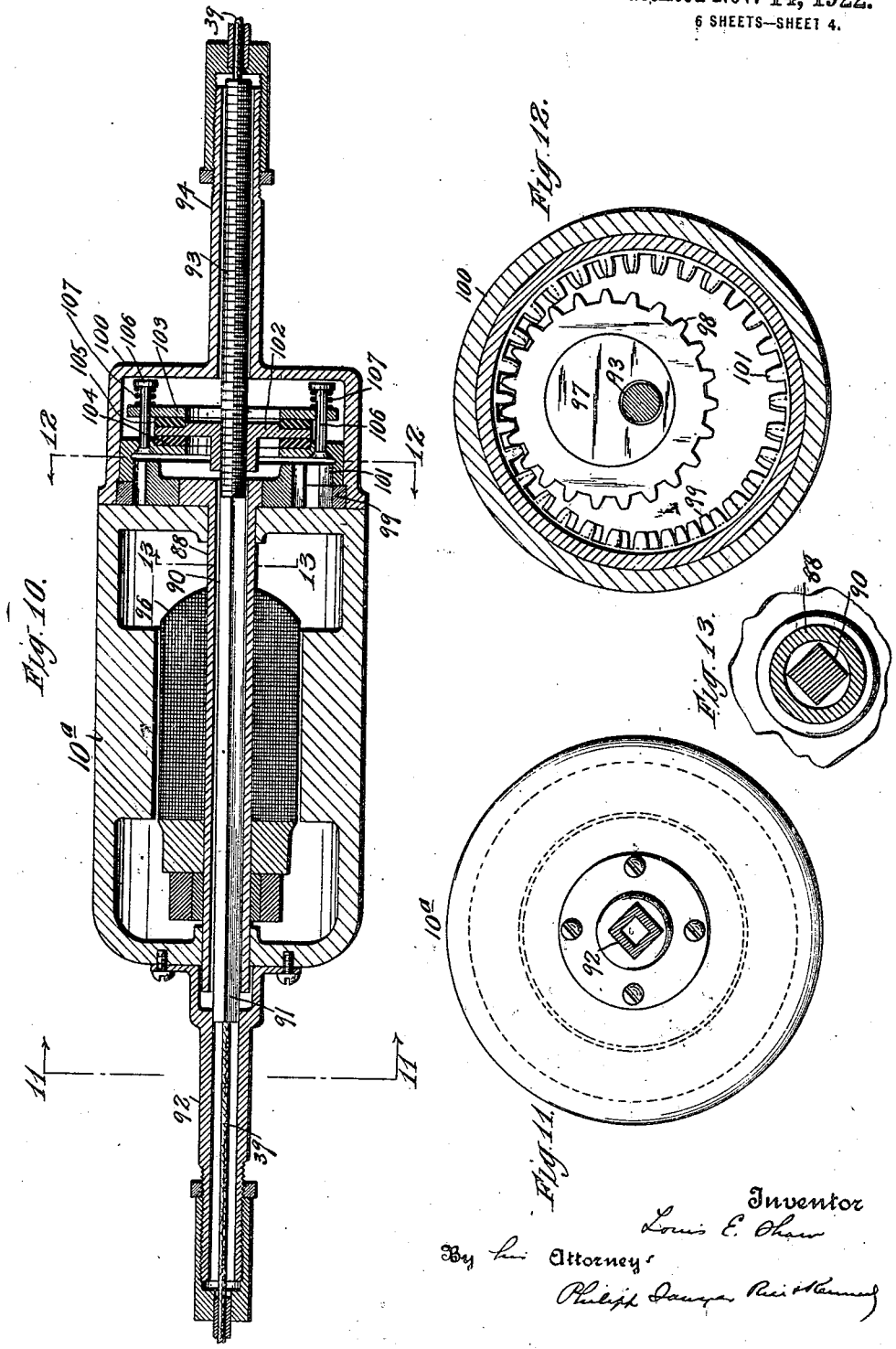

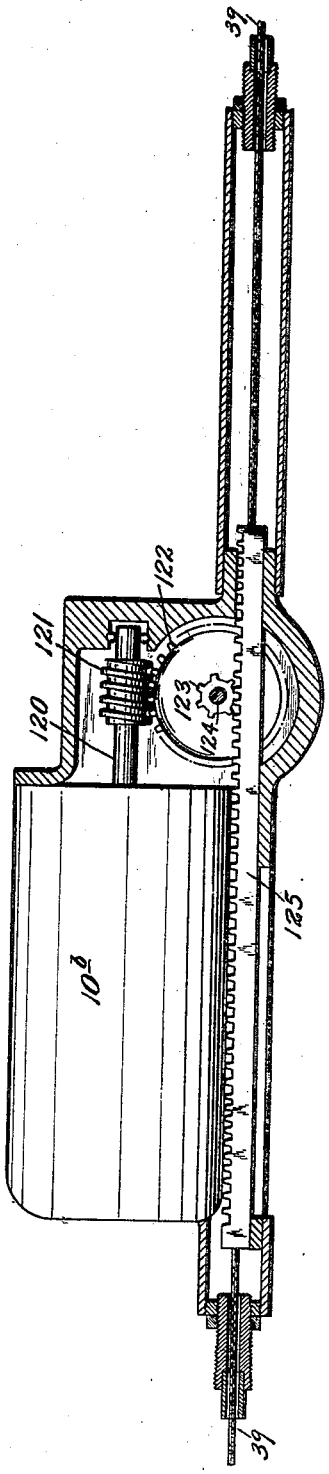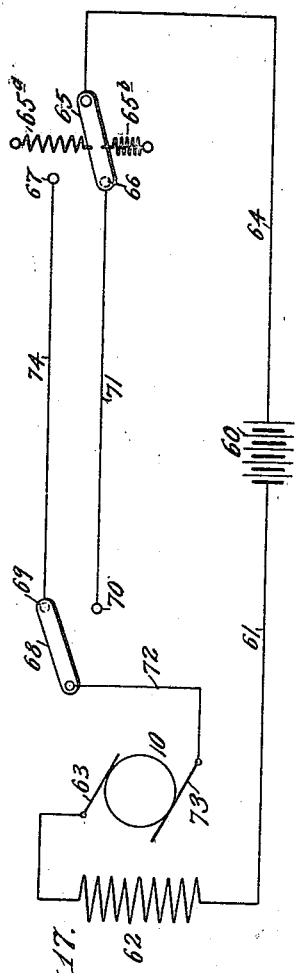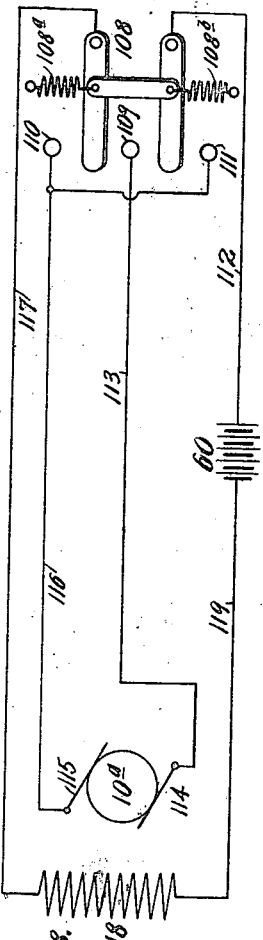

1,435,181.

Patented Nov. 14, 1922.
6 SHEETS—SHEET 6.

Patented Nov. 14, 1922.

1,435,181

UNITED STATES PATENT OFFICE.

LOUIS E. SHAW, OF EAST ORANGE, NEW JERSEY, ASSIGNOR TO EDWARD J. BULL-WINKEL, OF NEW YORK, N. Y.

VEHICLE-TOP-CONTROLLING MECHANISM.

Application filed May 5, 1917. Serial No. 166,554.

*To all whom it may concern:*

Be it known that I, LOUIS E. SHAW, a citizen of the United States, residing at East Orange, county of Essex, and State of New Jersey, have invented certain new and useful Improvements in Vehicle-Top-Controlling Mechanism, fully described and represented in the following specification and the accompanying drawings, forming a part of the same.

This invention relates to improvements in means for use in raising and distending, and lowering and collapsing, the tops of vehicles, including automobiles, boats and the like. One of the objects of the present invention is to provide a motor and connections for this purpose, controllable by the occupants of the vehicle, and so simple and compact in construction that they may be so positioned in the vehicle, as to be out of sight and protected from injury or disarrangement by contact with the occupants of the vehicle or articles carried in it; the apparatus being also of very small weight so as not to add materially to the weight of the vehicle. Another object of the invention is to provide the top or the bow or the bows thereof with a counterbalancing means, which will approximately balance the weight thereof so that very little effort by the motor will be required to open or close the top; this counterbalancing means being adapted for use without the motor, that is to say with the top opened and closed by hand.

In the accompanying drawings where the invention is illustrated in connection with an automobile, Figure 1 is a side elevation of so much of an automobile as is necessary for illustrating the present invention;

Figure 2 is a diagrammatic view of the front and rear bows of an automobile top, together with means for operating them so as to open and distend, or close and collapse, the top;

Figure 3 is a perspective view of the counterbalancing means for the top consisting of a spring connected with the rear bow and the automobile bed;

Figure 4 is a plan view (with the casing cover removed) of one form of top-operating motor which may be used in carrying out the present invention;

Figures 5 and 6 are sections of the same on the lines 5 and 6 of Figure 4;

Figure 7 is a cross-section of the same, on an enlarged scale, taken on the line 7 of Figure 6;

Figure 8 is a sectional detail on the line 8 of Figure 7;

Figure 9 is a sectional detail taken on the line 9 of Figure 6 showing a locking bolt operating between two bow-operating slides with which the motor shown in Figure 4 is provided as hereinafter described.

Figure 16:
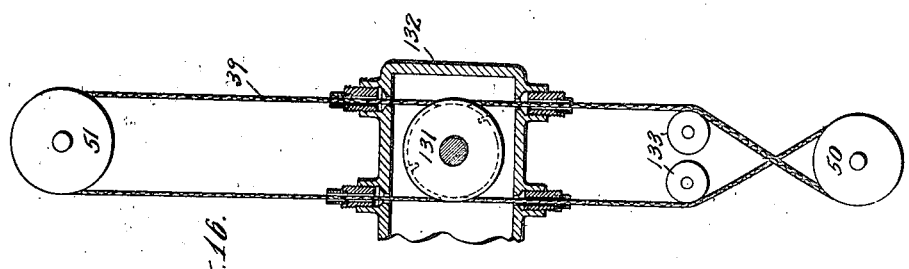
Figure 15:
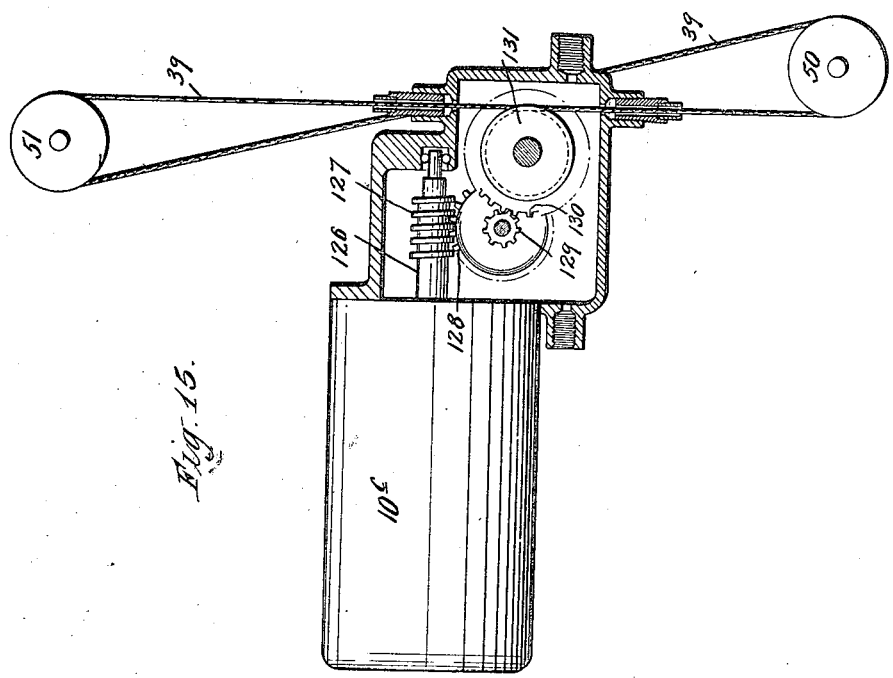

Figure 10 is a longitudinal section of another form of top-operating motor which may be used in carrying out the invention;

Figure 11 is an end thereof, on an enlarged scale, and partly in section on the line 11 of Figure 10;

Figure 12 is a section, also on an enlarged scale, on the line 12 of Figure 10;

Figure 13 is a section, also on an enlarged scale, on the line 13 of Figure 10;

Figure 14 is a plan view, partly in section of another form of top-operating motor which may be used;

Figures 15 and 16 illustrate other forms of top-operating motors; and

Figures 17 and 18 are diagrammatic views illustrating two kinds of circuits for use with the several forms of motors illustrated in the drawings.

Referring to said drawings, and more particularly to Figures 1 to 7, 1 represents part of the rear end of an automobile body and 2, 3, 4 its rear-seat supports, at the sides, these being indicated by dotted lines. 5 represents the automobile top 6, 7, the rear and front bows thereof and 8 a lazy-tongs device through which, as the rear and front bows 6, 7, are separated and closed, the automobile top is distended and folded or collapsed, respectively. 10 represents an electric motor, indicated by dotted lines in Fig. 1 and shown by full lines in Figures 4 to 9, for raising and lowering the bows 6, 7, and effecting these distending and folding or collapsing movements of the top. This motor comprises a field 11, a rotary armature 12, and an armature shaft 13 rotating therewith and journaled in a suitable bearing in the motor frame 14. Shaft 13 is coupled, by a sleeve 15 and pin 16 carried by shaft 13 and entering slots 17 in said sleeve, with a shaft 18 to which said sleeve is fixed and which is journaled in the motor frame 19. Shaft 18 carries a worm 20 which engages a worm wheel 21 loose upon a shaft 22 journaled in the motor frame 19 and which is provided with a worm 25 engaging a worm wheel 26, also suitably journaled in the motor frame 19. Shaft 22 is driven by gear 21 through a pawl and ratchet coupling comprising a disk 27, secured to shaft 22 by a pin 28, and spring pressed pawls 30 pivotally mounted in said disk and engaging notches 31 in the hub 32 or worm wheel 21. Therefore, as worm wheel 21 is rotated by worm 20, it will, by reason of its engagement with pawls 30, rotate the shaft 22 and through worm 25, rotate the gear 26. This pawl and ratchet coupling is provided between gear 21 and shaft 22 so as to provide for the manual operation of said shaft, to raise the automobile top, should the motor for any reason, refuse to work. For this purpose shaft 22 is extended outside the motor frame and its extended ends are squared for the reception of a wrench with which to turn the shaft by hand, the pawls 30 in such case riding idly over the notched hub 32 of disk 27.

Worm wheel 26 has fixed to it one end of a connecting rod 33, the opposite end of which is pivotally connected with a slide 34, mounted, with another slide 35, in a guideway provided by the motor frame 19 and a cover plate 36 (Fig. 6). The slide 35 has secured to its opposite ends the two ends 37, 38 of a belt or cable 39 which passes over pulleys 40, 41 (see Fig. 2) fixed to the inner ends of pins 42, 43 journaled in the sides of the car, near the rear, as shown in Fig. 1, and having fixed to their outer ends the ends of the rear bow 6. This belt or cable 39 is guided in its movements to rotate the pulleys 40, 41 by tubes 45, 46 between the slide 35 and the respective pulleys and also between the pulleys themselves, as shown in Figure 2. The slide 34 has secured to its opposite ends the two ends 47, 48 of another belt or cable 49 which passes over pulleys 50, 51, carried by sleeves 52, 53 loose upon the pins 42, 43 and to which the ends of the front bow 7 are fixed, as shown in Figure 2. The belt or cable 49 is guided in its movements between the slide 34 and the pulleys 50, 51, and between the pulleys themselves, by tubes 55, 56.

As before indicated the top-operating motor and the connections between it and the bows 6, 7, are, according to one feature of the present invention, concealed from view and from contact with the occupants of the car or articles carried in it. For this purpose the motor is, as shown in Figure 1, located below the rear seat and preferably in the space between it and the car floor. In this position it is out of sight and removed from all danger of disarrangement by contact with the occupants of the car or articles carried by it, and it is also in convenient position, on removal of the seat, for access for the purposes of inspection, adjustment and repair.

The connections between the motor and the bows 6, 7, namely the cables or belts 39, 49, are concealed from view and isolated from contact with persons or articles in the car by arranging them beneath the rear seat and also between the car sides and the upholstering at the ends of the seat. In this connection it will be noted that the tubes 45, 46, and 55, 56, not only serve as guides directing the cables 39, 49 to and from the pulleys 40, 41 and 50, 51, but also the purpose of guarding them against contact with the car body or its upholstering and against displacement by pressure from the bodies of the occupants seated on the rear seats or from articles which may be transported thereon. The tubes 45, 46 and 55, 56, are supported in their proper positions by extensions 57 of the motor frame in which the tubes are threaded. Between the outer ends the cables 38, 48, are further protected by housings 58 enclosing them.

The operation of the motor to effect the necessary sliding movements of the slides 34, 35 to operate the top 5 is controlled by an electric circuit such as that indicated diagrammatically in Figure 17, and for which any suitable source of electric energy may be provided. It is shown as including a battery 60, the negative pole of which is connected by a wire 61, to the motor field winding 62 and thence to brush 63 of the motor, and the positive pole of which is connected by wire 64, switch 65, and (depending upon the position of said switch with reference to contacts 66, 67, and of a switch 68 with reference to contacts 69, 70) by contact 66, wire 71, contact 70, switch 68 and wire 72 with the other brush 73 of the motor, or by contact 67, wire 74, contact 69, switch 68 and wire 72 with said terminal 73. The switch 65 is a hand-operated one located in convenient position for manipulation by the driver or other occupant of the machine, while the switch 68 is mechanically operated, automatically, by the slide 34, to open the circuit through the motor on the completion of a top-operating movement in either direction, as will presently appear.

Preferably the switch 65 is provided with a spring or springs 65$^a$ 65$^b$ which tend to move it to and hold it in a neutral position between the contacts 66, 67, so that in order to maintain the circuit through either contact closed it is necessary for the operator to hold the switch in engagement with such contact. When he releases his hold the springs 65$^a$ 65$^b$ will disengage the switch from the contact and move it to neutral position, thus opening the circuit. The reason for this is that it may sometimes be necessary or desirable to quickly interrupt the opening or closing movement of the top, as, for example, if a passenger in the car should have his hand or clothes caught in the bows. In such case a warning by the occupants of the car would cause the operator, almost involuntarily, to remove his hand from the switch, thereby opening the circuit and arresting the movement of the top.

Assuming the parts to be in the position indicated in Figure 17, the circuit from battery 60 is open and the motor is at rest, with the slides 34, 35 in the positions they will occupy when the bows and the automobile top are in their lowered position. When it is desired to open the top all that is necessary to do is to move the switch 65 by hand from the position shown into engagement with contact 67 and hold it there. The current will then flow from the positive pole of battery 60, by wire 64, switch 65, contact 67, wire 74, contact 69, switch 68, and wire 72 to brush 73 of the motor, and thence by terminal 63 and wire 61 back to the negative pole of the battery. The motor will then, through the shafts 13, 18, and worm 20, rotate the worm wheel 21 which will, in turn, through the pawl and ratchet disk 27, rotate shaft 22, and, through worm 25 on the latter rotate worm wheel 26. As gear 26 is thus rotated, the connecting rod 33, carried thereby, will move the slide 34 to the left (Fig. 6) and the latter will, in turn, through the belt or cable 49, turn the pulleys 50, 51 so as to raise the front bow 7. Slide 34 is also moved simultaneously in the same direction through connections between it and the slide 35 comprising sliding pin 75. (Figs. 6, 9). This pin 75 has a cylindrical upper portion and a flattened lower portion and is also tapered at its opposite ends 76, 77 to co-act with a cam opening 78 and a cam 79, respectively, provided in the motor frame, for a purpose which will presently appear. The lower slide 34 is provided with an elongated keyhole slot 80 for a portion of its length with which this pin co-acts for the purpose of connecting the two slides 34, 35, as shown in Figure 6, or for disconnecting them, according to the position of the pin 75 vertically. In the position in which the pin is shown in Figure 6, which is its lowermost position, the lower end of its cylindrical upper portion rests in the enlarged end of the slot 80, thereby coupling the slides 34, 35, with the result that as the slide 34 is moved by the gear 36, as already described, the slide 35 will be moved with it, to the left of Figure 6, and, as so moved, will swing the rear bow 6 upwardly to the position shown in Figure 1. In this position of the rear bow the front bow 7 will rest against it, but in order to open the top 5 and distend it to the position shown in Figure 1, this bow 7 must have a further movement, away from the rear bow 6, which must be left at rest. This movement is accomplished by the cam 79, which, by engagement with the lower end of the pin 75, will raise said pin and move it upwardly through the upper slide 35 into the cam opening 78. This movement of the pin removes the lower end of the cylindrical portion thereof from the keyhole slot 80 with the result that the flattened lower portion of said pin will enter the contracted portion of said slot and thus permit the lower slide 34 to move relatively to the pin 75 and the slide 35, which then remains at rest. The movement of the lower slide 34 being continued beyond this point, the front bow 7 will be swung away from the rear bow 6 and thereby, through the lazy-tongs 8, distend and fully open the top 5. As it reaches its limit of movement, necessary for so opening the top, a pin 81 carried by the slide 34 will engage the switch 68 and swing it out of engagement with contact 69 and into engagement with contact 70, thereby breaking the circuit from battery 60, the hand-switch 65 at this time being still held by the operator in engagement with the contact 67. Hand switch 65, being then released by the operator, will be returned to neutral position by its springs $65^a$ $65^b$. The movement, just referred to, of switch 68 not only breaks the circuit but sets it for closing when it is desired to lower the top; all that is then necessary to be done being to move the switch 65 from neutral, into engagement with the contact 66 and hold it there. When the switch is thus moved and held the circuit through the motor is again closed and the gear 26 will, through its connecting rod 33, move the lower slide back to the position in which it is shown in Figure 6. During the first part of its movement in this direction there will be no movement of the upper slide 35 and therefore no movement of the rear bow 6. When the front bow 7, however, has been folded back against this rear bow, the enlarged end of the keyhole slot 80 will engage the pin 75, which will then be moved downwardly by the cam surface of opening 78, so that the lower end of the cylindrical upper portion will again enter the enlarged end of the slot 80 and again couple the upper slide 35 to the lower slide 34. Both slides will then move together, with the result that the front and rear bows 7, 6, will be swung downwardly to the position shown in Figure 2. As the slide 34 is thus moved another pin 82 carried thereby will engage the switch 68 and swing it out of engagement with contact 70 and again into engagement with contact 69, thus breaking the circuit through the motor and at the same time setting it for closing when the hand switch 65 is again moved into engagement with contact 67.

There is also provided a counter-balancing device for the rear bow 6, as indicated by dotted lines in Figure 1; this counter-balancing device consisting of a spring 85 connected at one end with an arm 86 fixed to the pin 42 of said bow 6 and at its other end with a bracket 87 secured to the car body. The strength of this spring is such as to approximately balance the weight of the bows so that but very little effort is required of the motor to open and close them. A motor is preferably provided for such purpose, but it may, without departing from my invention, be omitted, the counter-balancing spring being retained and the opening and closing movements of the top then effected by hand.

In the construction shown in Figures 10 to 13 the motor 10ª, unlike the motor 10 of the preceding figures, is designed to be reversed, in the direction of the rotation of its shaft 88, as the movement of the automobile top is reversed. In this case also there is but one belt or cable 39 and this is designed to pass around the pulleys 40, 41, of the front bow. As the front bow is moved to top opening position the rear bow, by reason of the action of the counter-balance spring 85, follows the front bow until the movement of the rear bow is arrested by strap 89 (Fig. 1), and as it is moved to closing position the rear bow is pushed to such position. Extending through the armature shaft 88 of motor 10ª is a rod 90, this rod having a squared portion 91 entering a correspondingly shaped opening in an extension 92 at one end of the motor frame, which prevents turning of said rod, and a threaded portion 93 entering an extension 94 at the other end of the motor frame. One end of the cable 39 is secured to the squared end of rod 90 and the other end thereof to the threaded end of said rod, as shown in Figure 10. The armature shaft 88 of the motor, carrying the armature 96 is suitably journaled in the ends of the motor frame. At that end of the motor next the threaded end of the rod 90 the armature shaft 88 is provided with an eccentric 97 rigidly fixed to it and on this eccentric there is loosely mounted a gear 98 meshing with an internal gear 99 fixed to the motor frame and to a casing 100 forming part of the extension 94, and with a gear 101 rotatably mounted in said casing 100, and which is rotated by said gear 98. This gear 101 has frictionally connected with it an interiorly threaded nut 102 engaging the threaded portion 93 of the rod 90, so that as said nut is rotated it will move said rod endwise in one direction or the other, depending upon the direction of rotation of armature shaft 88. The frictional connection referred to, between the gear 101 and threaded nut 102, is provided by a disk 103, suitable packing rings 104, 105, pins 106 secured to said gear 101, and passing through openings in the disk 103, and spiral springs 107 between the heads of said pins and said disk. These springs, with the packing rings 104, 105, frictionally connect the nut 102 with the gear 101 so that, should the movement of the nut 102 and shaft 90 by said gear 101 be resisted, slip will occur between said gear and nut and breakage of the motor and connected parts thus be avoided. This is important for reasons which will presently be stated.

With a motor such as that just described, which is intended to be reversed as to the direction of the rotation of its armature when the automobile top is to be opened or closed, as the case may be, a different circuit must be provided from that illustrated in Figure 17. A circuit suitable for use with such a motor is illustrated diagrammatically in Figure 18. This circuit it will be observed does not include any automatic, mechanically operated switch, as in the case of the circuit illustrated in Figure 18, but simply a manually operated switch 108 adapted to engage contacts 109, 110, or 109, 111, and which is designed to be controlled by the driver of the automobile. Like switch 65 of Fig. 17, and for the same purpose, switch 108 is provided with springs 108ª, 108ᵇ which normally hold it in its neutral position. When it is engaged with contacts 109, 110, the positive pole of battery 60 will be connected by wire 112, switch 108, contact 109, wire 113 with one brush 114 of the motor 10ª, the current passing thence through the armature, and brush 115, wire 116, contact 110, switch 108, wire 117, field 118, wire 119, to the negative pole of the battery 60. So long as this circuit remains closed the armature shaft 95 will be rotated in one direction thereby raising or lowering the front and rear bows 7, 6 and opening or closing automobile top 5, as the case may be. When such movement of the top is completed, the switch 108 is released by the operator and secured by springs 108ª, 108ᵇ, to its neutral position, indicated in Figure 18. Should the driver of the car, however, neglect to release switch 108, further rotation of the armature shaft 95 will not result in any injury to the mechanism, because of the friction connection, heretofore described, between the gear 101 and the nut 102, this connection providing for slip between the gear 101 and nut 102. When it is desired to move the top in the opposite direction the switch 108 will be moved from neutral into engagement with the contacts 109 and 111 and held there. In such case a circuit will be established from the positive pole of battery 60 by wire 112, switch 108, contact 111, wire 118, and wire 116 to the other brush 115, of the motor 10ª, and thence by brush 114, wire 113, contact 109, switch 108 and wire 117, field 118, and wire 119 to the negative pole of battery 60. Should this circuit remain closed after the automobile top has reached its limited movement slip will also occur between the gear 101 and nut 102, thus avoiding any injury to the mechanism.

In the construction shown in Figure 14 the motor is also designed to be reversed, in the direction of rotation of its armature shaft 120. With this motor 10$^b$ the same circuit will be used as with the motor 10$^a$ of Fig. 10–13. Motor shaft 120 is provided with a worm 121 engaging and driving a gear 122 which has a pinion 123 on shaft 124 engaging a rack bar 125 which is moved by it, in one direction or the other, according to the direction of rotation of the shaft 120. As the rack bar 125 is moved in one direction it will, through the cable 39 connected with its opposite ends, open the automobile top, and as it is moved in the opposite direction will close the top, as in the construction illustrated in Figures 10 to 13.

In the constructions illustrated in Figure 15 the motor 10$^c$ has an armature shaft 126 rotatable in opposite directions. A circuit such as that shown in Fig. 18 will be used with it. Shaft 126 is provided with a worm 127 rotating a worm wheel 128, the shaft of which carried a pinion 129 engaging and rotating a gear 130, which has fast to it a pulley 131. This pulley has connected with it (by a turn of the same about it) the cable 39 which, as in previously described constructions, passes over the pulleys 50, 51 of the front bow 7. As the armature shaft 126 is rotated in one direction the pulleys 50, 51 will be turned so as to open the automobile top, and when the rotation of said shaft 126 is reversed, said pulleys will be turned by the cable 39 so as to close the automobile top.

The construction illustrated in Figure 16 is similar to that of Figure 15 except that the cable 39 enters the casing 132 enclosing the driving pulley 131 so as to impinge against said driving pulley at diametrically opposite points and also in the provision of guiding and deflecting pulleys 133 for the cable 39 so that both of the pulleys 50, 51 will be turned in the same direction by said cable.

What I claim is:—

1. In a vehicle, the combination with an opening and closing top pivotally supported on the body thereof, of an electric motor, a member movable endwise thereby alternately in opposite directions, flexible connections between said member and the top controlling the opening and closing movement of the latter and a manually controlled electric circuit for the motor.

2. In a vehicle, the combination with an opening and closing top pivotally supported on the body thereof, of an electric motor, a member movable endwise thereby alternately in opposite directions, intermediate connections between the motor and the movable member for effecting the movement of said movable member without reversing the motor, flexible connections between said member and the top controlling the opening and closing movement of the latter and a manually controlled electric circuit for the motor.

3. In a vehicle the combination of an opening and closing top pivotally supported on the body thereof, slides for operating said top, flexible connections between the top and the slides, a motor, a motor driving shaft, a driven shaft, shaped at one end to receive a suitable operating crank, a ratchet and pawl driving connection between the motor driving shaft and the driven shaft and intermediate gearing between the driven shaft and the slides for reciprocating the latter, said gearing operating to move one of the slides farther than another of said slides.

4. In a vehicle the combination of an opening and closing top pivotally supported on the body thereof, slides for operating said top, flexible connections between the top and the slides, a motor, a motor driving shaft, a driven shaft, shaped at one end to receive a suitable operating crank, a ratchet and pawl driving connection between the motor driving shaft and the driven shaft and driving connections between the driven shaft and the slides for moving the slides in opposite directions without reversing the motor.

In testimony whereof, I have hereunto set my hand.

LOUIS E. SHAW.